G. V. BARTON.
MANUFACTURE OF RED LEAD.
APPLICATION FILED FEB. 15, 1909.

988,964.

Patented Apr. 11, 1911.

2 SHEETS—SHEET 1.

G. V. BARTON.
MANUFACTURE OF RED LEAD.
APPLICATION FILED FEB. 15, 1909.
988,964.
Patented Apr. 11, 1911.
2 SHEETS—SHEET 2.
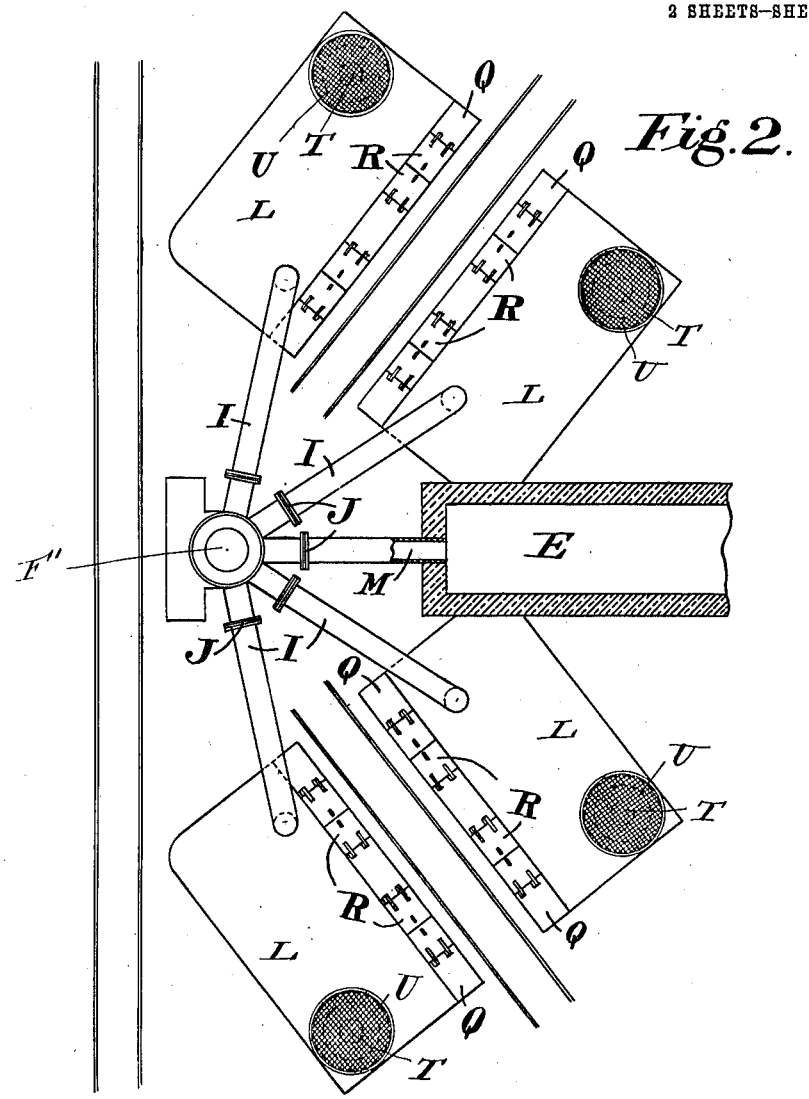
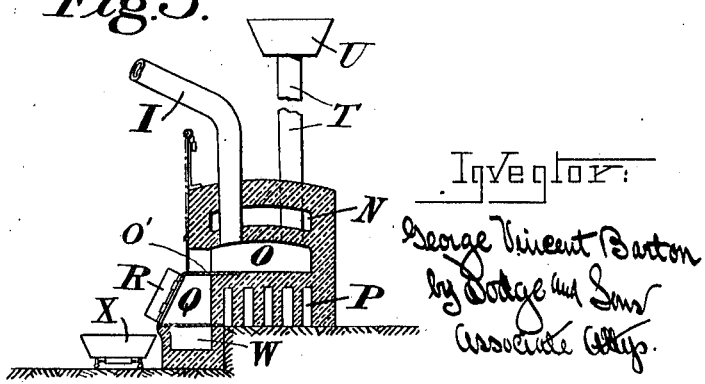

UNITED STATES PATENT OFFICE.

GEORGE VINCENT BARTON, OF LIVERPOOL, ENGLAND.

MANUFACTURE OF RED LEAD.

988,964.  Specification of Letters Patent.  Patented Apr. 11, 1911.

Application filed February 15, 1909. Serial No. 477,964.

*To all whom it may concern:*

Be it known that I, GEORGE VINCENT BARTON, subject of the King of Great Britain, residing at Mossley Hill, Liverpool, in the county of Lancaster, in the Kingdom of England, have invented certain new and useful Improvements in the Manufacture of Red Lead, of which the following is a specification.

In the manufacture of red lead, it is found extremely important to have the lead oxid as finely divided as possible, and the ordinary lead oxid of commerce is accordingly ground to an impalpable powder before being made into red lead or white lead. This is a costly process and has a very injurious effect, through the dust caused by it, on the constitutions of the workmen, and also it does not give as fine a body as can be secured by the processes of causing a blast to play upon molten lead. This process hitherto has always failed to produce a satisfactory red lead, in that it is found that an extremely fine dust of metallic lead is carried off with the lead oxid and in the subsequent treatment for making red lead this lead dust is very pernicious. Again, the shoveling of this extremely fine lead oxid into the lead furnace is very deleterious to the health of the workmen, as a great deal of dust is caused and further, it is almost impossible to prevent this dust from flying off with the products of combustion in the ordinary process. Now by the present invention, I make this extremely fine lead oxid absolutely clear of metallic lead, and without touching it in any way, deposit this lead oxid into chambers, and oxidize it to red lead without touching the material.

Figure 1:
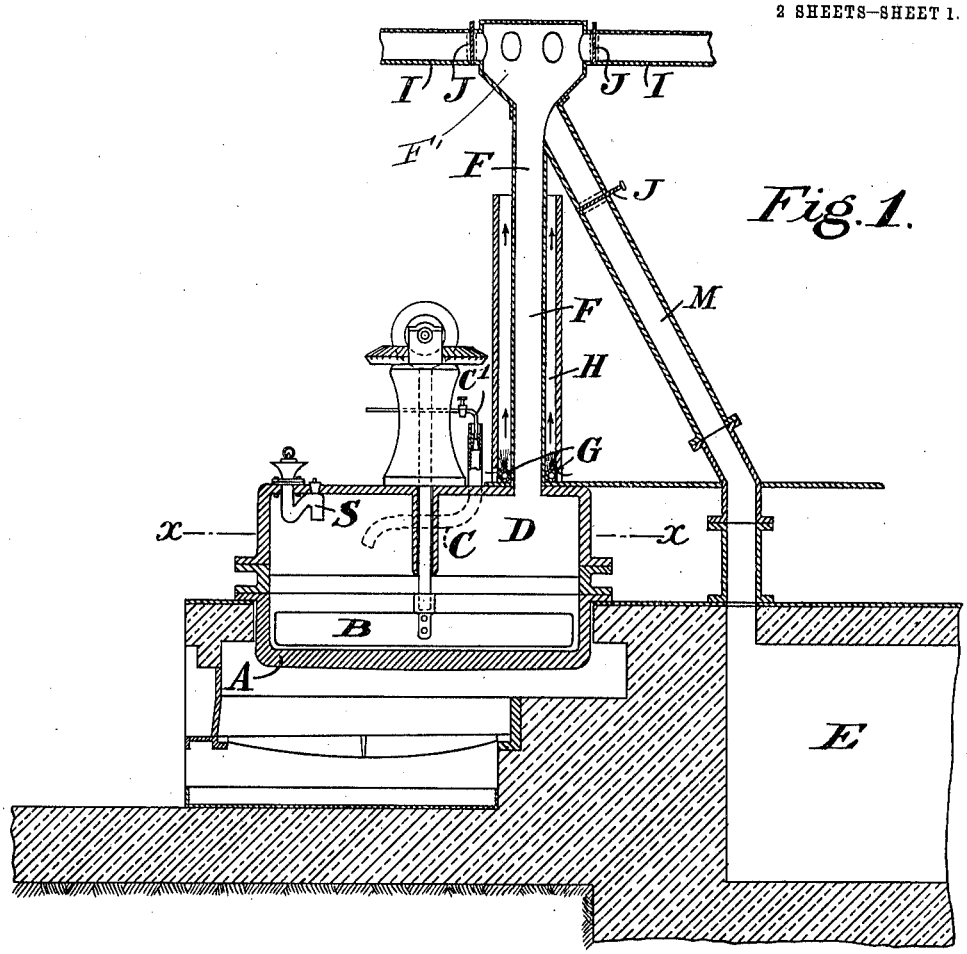
Figure 4:
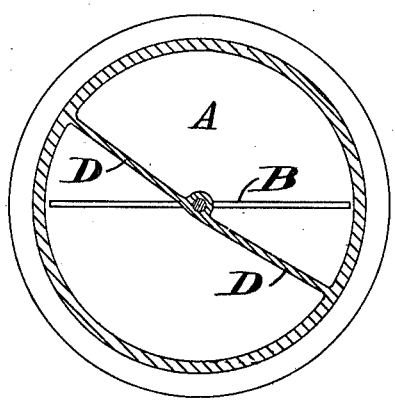

The invention is best described by the aid of the accompanying drawings, in which:

Figure 1 shows a vertical section of part of my apparatus; Fig. 2 a plan, partly in section, of other parts; Fig. 3 a vertical section through the red lead furnace, and Fig. 4 a section on line X—X, Fig. 1.

In these, A is an iron pot, B a stirrer caused to revolve in said iron pot by gearing above from any suitable source of power.

D is a baffle-plate fixed across the pot at a height of about six or seven inches from the bottom C is a blast pipe for conducting a blast of air into the pot. The pipe is two inches in diameter, and the steam jet C' is three-sixteenths of an inch in diameter. The pipe is open to the air, which is injected by means of said steam jet. Any suitable means may be employed to produce the air blast.

S is a trap arranged so as to allow the lead to be poured into the pot without undoing the pot or opening a man-hole.

F is a tall pipe about six feet high, surrounded by a jacket H, which latter is slotted at the bottom, and a series of gas-jets G is placed adjacent to the slots between the jacket and the pipe. Pipe F terminates in a chamber F', and from this extends a series of pipes I, having dampers J. Another pipe M, also with a damper, J', descends to a settling chamber E. The pipes I radiate to the red lead chambers or furnaces L. Each of these chambers has a stand-pipe T, surmounted by a filtering device U, whereby any dust which may escape up this pipe is filtered out. The red lead furnace is of the muffle variety, and is provided with a chamber O, having heating flues N and P around it, a chamber Q at one side with a cold-air flue W underneath, and a door R which may be opened so as to rake the material out of chamber Q into the wagons X.

The mode of action is as follows: The pot A being filled to the height of about four or five inches with lead, and the stirrer B being set revolving, the steam blast C' is set going, thus bringing a strong blast of air and steam against the surfaces of the lead which is being agitated by the stirrer. The result is that the lead rapidly oxidizes, and a tremendous stream of lead oxid, finely-divided metallic lead and gases passes up the shaft F. This shaft F has previously been heated to a low red heat by the gas-jets G. The result is, that the almost gaseous mixture of red lead, infinitely fine lead and air, steam and nitrogen is heated to a very considerable degree. This oxidizes all the fine lead, while the larger particles of lead fall back into the pot, and absolutely nothing but lead oxid and gases escape into the pipes I and M. The dampers are so arranged that the stream flows into one of the chambers L, the air, gas and nitrogen pass up through the pipe T, and are filtered by the filter U from any lead oxid. This goes on until the pot is emptied. The blast is still allowed to blow into the pot until the temperature has been reduced to about 400°, when lead is again run in, and the process repeated until the chamber L is filled to the required height. The chamber is now cut off by its damper J, and another furnace charged in the same way, and so on until all the chambers are charged; then if there are no more chambers to fill, the lead oxid is passed into the settling chamber E until such time as one of the chambers has sufficiently cooked its lead, and is scraped out. In that case the horizontal damper O' shown in the drawings between the chamber O and the chamber Q is opened, and the red lead pushed into this chamber, the damper closed, when the red lead chamber is ready for a fresh supply. In the meantime, the red lead in the chamber Q cools down to a moderate heat when it is scraped out into wagons X. The material in the chamber E is drawn out from time to time, and dissolved in a solution of lead acetate and is afterward precipitated by carbonic acid to make white lead, or the material is carbonated in any other known manner.

I claim as my invention:

1. In combination with means for producing an intimate mixture of finely-comminuted melted lead, steam and air; means for applying further heat to the resulting intimate mixture of dust and gases while the dust is in suspension in the air, until all the lead is converted into oxid without fusing the oxid; and means for bringing the intimate mixture of oxid of lead and gases to red lead or depositing chambers.

2. The combination with a pot having a stirrer mounted therein; of means for producing a blast upon the charge of lead within the pot; a baffle plate; an upwardly-extending pipe opening at its lower end into the upper portion of the pot; a casing around the pipe; means for heating the pipe inside the casing; and means for taking the mixture of oxid of lead and gases thus produced, while the former is still in suspension in the gases, to red lead furnaces.

3. In combination with a pot; means for heating the same; means for supplying to it lead, steam and air, with violent agitation; means for heating the effluent to such a degree as to oxidize the fine lead while still intimately mixed with the air and gases; a series of surrounding red lead furnaces; means for distributing the effluent to these furnaces; and means for filtering the air and gases escaping from these furnaces.

4. In combination with a pot, means for heating the same; means for supplying lead, steam and air to the pot; means for heating the effluent to such a point as to oxidize the fine lead in the mixture during its passage from the pot; a series of surrounding red lead furnaces; means for distributing the effluent to these furnaces *seriatim;* and an exit standpipe from each of these furnaces having a filtering device at the upper end.

5. In combination with a pot, a stirrer; an air and steam blast; a baffle-plate; a high vertical exit having a heating device; muffle furnaces; means for carrying the effluent matter from the high exit to the muffle furnaces; and means for allowing the gaseous material to escape while preventing the escape of the solid material.

6. In combination with an iron pot, means for playing an air and steam blast on the lead contained therein; an exit terminating at a point high above the pot; muffle furnaces; a settling chamber; a series of pipes extending from the exit to said furnaces and chamber; and means for regulating the transmission to the various furnaces or settling chamber, substantially as described.

7. In an apparatus for making red lead, the combination of a pot; an air and steam jet opening into the same; a baffle-plate; a stirrer; a series of red lead furnaces arranged adjacent to the pot; a series of conduits connecting the exit of the lead oxid pot with the red lead furnaces; a settling chamber; a further conduit from the lead oxid pot to the settling chamber; and means for opening or cutting off any or all of these conduits as required.

8. The combination of a lead oxid manufacturing pot, a red lead muffle furnace; a conduit connecting the two; means for heating the material during its passage through said conduit to a sufficient degree to oxidize all the lead; and a heating device surrounding the red lead muffle furnace in such manner that the products of combustion are prevented from entering the muffle furnace.

9. The combination of a lead oxid manufacturing pot, a red lead muffle furnace; a conduit connecting the two; a heating device on said conduit; a heating device surrounding the red lead muffle furnace in such manner that the products of combustion cannot enter the muffle furnace chamber; a closed chamber for depositing the finished red lead scraped out of the muffle furnace; and means for admitting the discharge of the same, substantially as described.

In witness whereof, I have hereunto signed my name this 3rd day of February 1909, in the presence of two subscribing witnesses.

GEORGE VINCENT BARTON.

Witnesses:
JOHN KERBEY,
WM. PIERCE.